April 25, 1967     I. FARER     3,315,474

MOBILE THERMOELECTRIC REFRIGERATION SYSTEM

Filed Aug. 23, 1965     3 Sheets-Sheet 1

IRVING FARER
INVENTOR.

BY R. E. Geauque

ATTORNEY

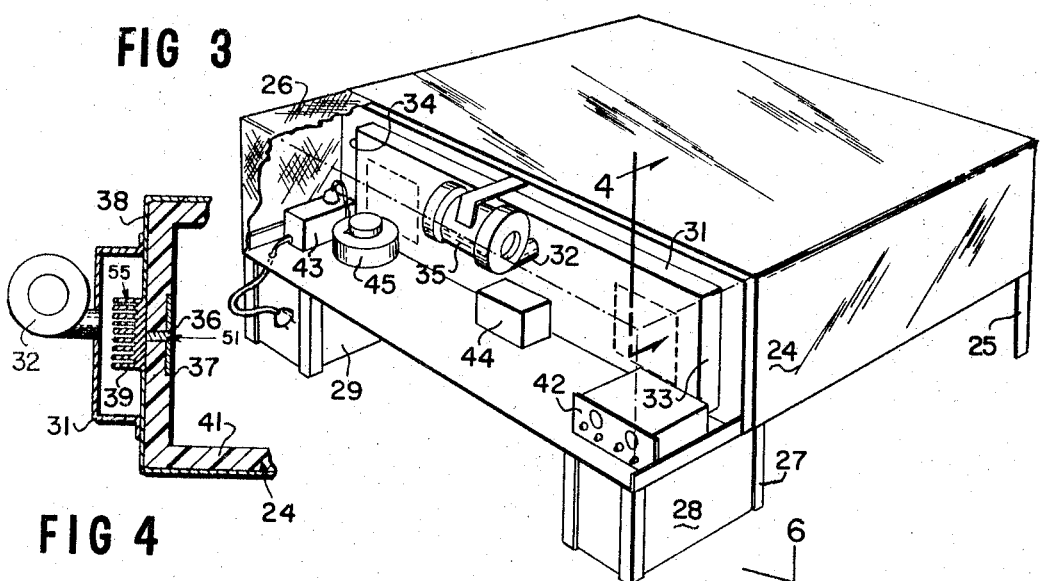
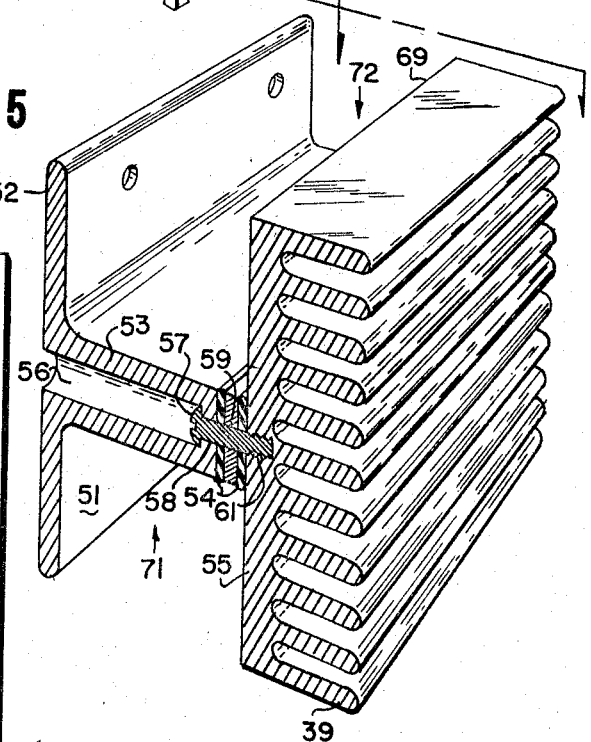
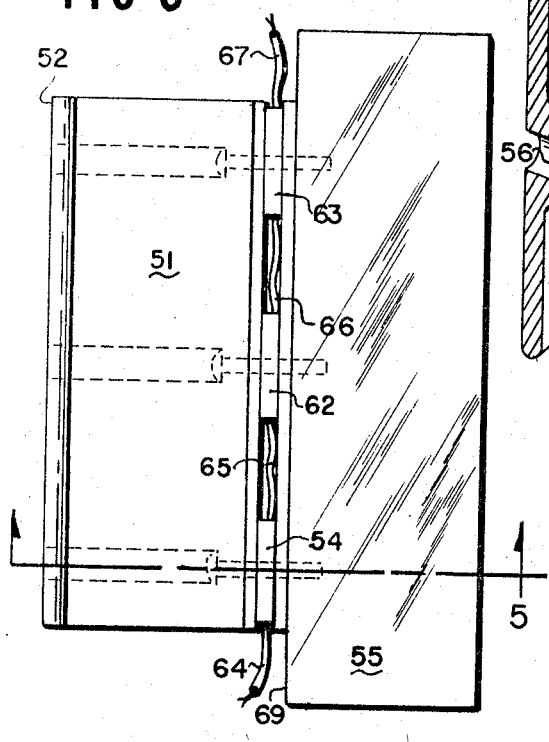
IRVING FARER
*INVENTOR.*

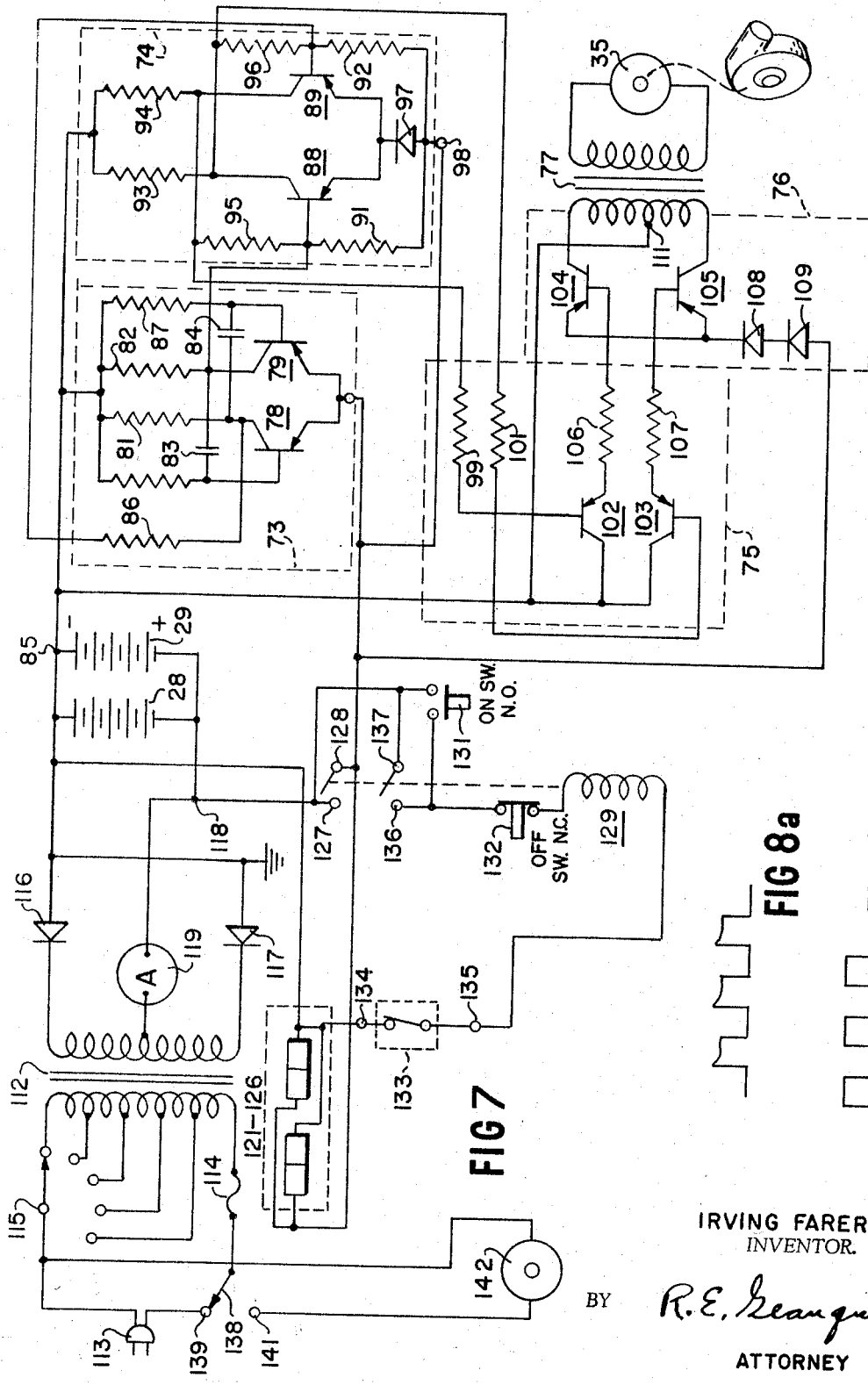

United States Patent Office 3,315,474
Patented Apr. 25, 1967

3,315,474
MOBILE THERMOELECTRIC REFRIGERATION SYSTEM
Irving Farer, 4654 Kraft Ave., North Hollywood, Calif. 91602
Filed Aug. 23, 1965, Ser. No. 481,706
17 Claims. (Cl. 62—3)

This invention relates to thermoelectric refrigeration systems and more particularly to a mobile refrigeration system adapted for installation and operation in a motor vehicle such as a delivery truck of the type employed in the distribution of perishable products.

Trucks employed to transport perishables such as food and dairy products have, heretofore, been outfitted with various means for cooling the truck's insulated storage compartment. Especially in delivery trucks for dairy products, such as milk, it is necessary that the milk be retained at a predetermined low temperature, generally ranging from 34° to 40° F. Certain standards, relating to food handling, have been set up by various health departments and such standards usually include the requirement that any milk which has been subjected to storage temperatures of more than 40° F. may not be distributed. In certain instances conventional mechanical refrigeration equipment, of either the compressor or the adsorption type, have been employed in trucks to maintain the required storage temperature.

Catering trucks, from which food products and perishables are directly served, have for the most part been cooled by means of ice. Attempts have been made to provide mechanical refrigeration in such trucks since it has been found that ice is inadequate and unsuitable in many applications, and fails to meet the temperature requirements established by health departments or similar agencies responsible for maintaining health standards. However, prior attempts at mechanical refrigeration have been characterized by a number of shortcomings, an important one of which is the inability of the system to run continuously, particularly during standby periods such as overnight storage and during periods when the truck's engine is not in operation.

Attempts to solve the problem have in certain instances involved the use of a relatively large and extremely heavy auxiliary refrigeration unit supported on the insulated storage compartment. The exceedingly heavy weight of the apparatus used herebefore requires an extra heavy reinforced construction of the truck body and even with such reinforcement, this high weight frequently causes damage during transport thus reducing the useful life of the apparatus. In large inter-city transport trucks it has been feasible to employ auxiliary gasoline engines to power a mechanical refrigeration system. However, in a smaller vehicle such as a catering truck the use of an auxiliary engine is not feasible due to the above-mentioned limitations in available space and vehicular weight carrying capacity, as well as the undesired effects of noise and engine exhaust which would preclude the use of such auxiliary engines for catering service.

In view of the various objectional features of prior refrigeration systems, there is provided by the present invention a refrigeration system adapted especially for delivery trucks which is exceedingly light in construction, efficient in operation, easily installed without additional reinforcing, accurately controlled for maintaining a desired temperature in the load carrying compartment, and yet is relatively inexpensive to install and maintain. The system of the present invention employs thermoelectric cooling and therefore is not only compact and lightweight, but is silent in its operation and produces no noxious fumes which would interfere with the direct serving of food from the vehicle. Another advantage of the thermoelectric cooling system of the invention is that it is sufficiently rugged to withstand the shock and vibrations to which a mobile system is subjected in normal use.

Thermoelectric cooling devices have been used heretofore for certain specialized applications but, prior to the present invention, this technique of cooling has not been successfully adapted for refrigerating and storage compartment of a truck designed to transport perishables. Prior thermoelectric systems have, for the most part, not had sufficient capacity for use in the application contemplated by the present invention, nor have they been capable of operating continuously whether the vehicle was, or was not, in motion. In order to meet the requirements that the system be capable of continuous operation, the system of the present invention is designed to operate under three separate operating modes, the first of which derives its power from the vehicle's engine. Under the second mode of operation the system derives its operating power from storage batteries, and in the third mode, the system derives its power from a 115-volt, 60-cycle, A.C. house current supply to which it is connected. The storage batteries are automatically recharged during the above-mentioned first and third operating modes.

It is, therefore, an object of the invention to provide a novel and improved thermoelectric refrigeration system for use in a mobile vehicle and which may be operated continuously, which is efficient in its operation, and which is rugged in its construction.

Another object of the invention is to provide a novel and improved thermoelectric refrigeration system which may be built into a truck or which may be separately fabricated as a package and thereafter installed in a motor vehicle.

It is another object of the invention to provide a novel and improved mobile refrigeration system which may be operated from the engine of the carrying motor vehicle, or from storage batteries, or from an alternating current house supply.

Yet another object of the invention is to provide a novel and improved thermoelectrically cooled storage compartment, having a forced air cooling system for dissipating the heat extracted from the storage compartment.

Still another object of the invention is to proivde a novel and improved thermoelectric cooling system employing an A.C. motor-driven blower and a transistorized inverter for supplying the alternating current for powering the motor.

A further object of the invention is to provide a novel and improved mobile refrigeration system which consumes little power, is light in weight, and which is reliable and durable.

A general object of the invention is to provide a novel and improved refrigeration system which overcomes disadvantages of previous means and methods heretofore intended to accomplish generally similar purposes.

The invention will be understood more completely from the following detailed description, taken in conjunction with the drawings, in which:

FIGURE 3 is a somewhat diagrammatic perspective view, partially broken away, illustrating a unitary refrigeration unit constructed in accordance with the invention, for subsequent installation into a motor vehicle.

FIGURE 4 is a cross-sectional view, taken along line 4—4 of FIGURE 3, illustrating the relationship of the forced-air blower system with respect to the thermoelectric modules.

FIGURE 5 is a perspective detail view showing the thermoelectric module portion of the apparatus of FIGURE 4.

FIGURE 6 is a top plan view of the apparatus of FIGURE 5.

FIGURE 7 is a schematic circuit diagram of the invention.

FIGURES 8a and 8b are waveform diagrams of assistance in the exposition of the invention.

Figure 1:
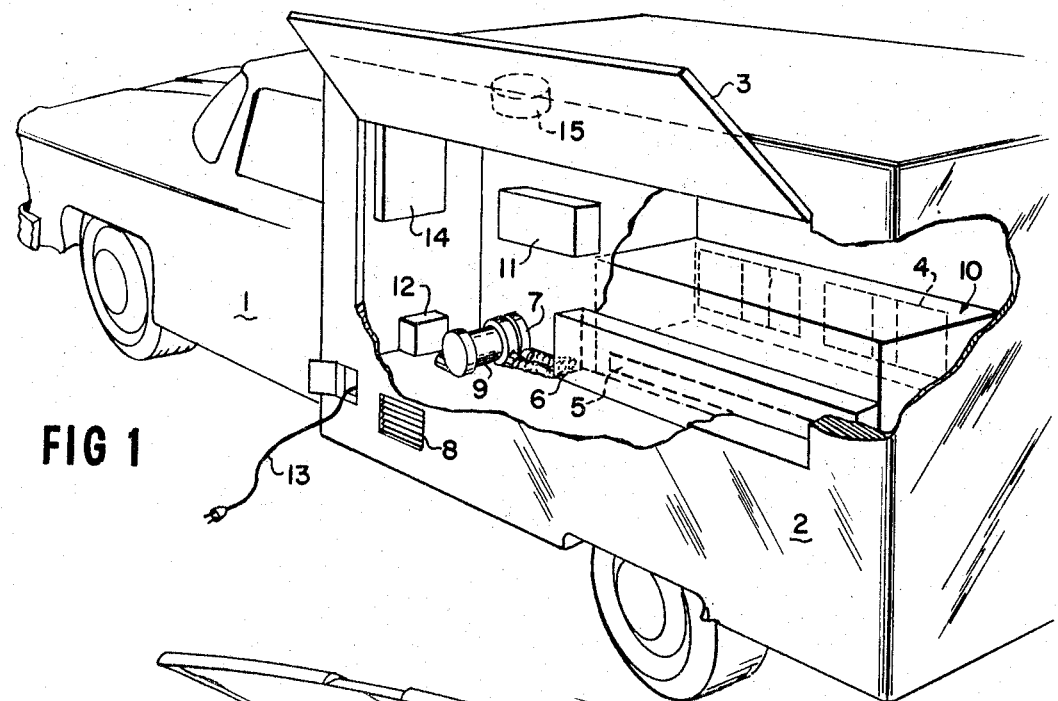
FIGURE 1 is a perspective view, partially broken away, illustrating the various subassemblies comprising a refrigeration system, constructed in accordance with the invention and built into a catering truck.

Looking now at FIGURE 1, there is shown an embodiment of the invention as installed within a catering truck. The truck is generally designated by the numeral 1 and includes an insulated load carrying body 2 and a cab and hood assembly which is of conventional construction, which is equipped with the usual ground engaging wheels, internal combustion engine and other features normally employed in a conventional delivery truck. The truck body 1 will generally include an outer wall and an inner wall held in spaced relationship to each other by structural members, with the area therebetween being filled with insulation material, if desired. The side of the truck body is provided with an openable hinged outer door 3 permitting access to the interior of the refrigerated storage compartment. The refrigerated compartment is suitably mounted within the truck body 2 and is provided with various sliding inner doors, a typical one being illustrated at 4. The compartment 10 is thermally insulated and has an opening in its inner wall through which extends the cold junction of thermoelectric module bank 5. The hot junction of thermoelectric module bank 5 is in thermal contact with a heat radiator which extends into a forced air cooling plenum 6. Ambient air is forced into plenum 6 by means of blower 7. Outside air is drawn into the blower via air vent 8. The blower is driven by means of an alternating current (A.C.) motor 9 which in turn is powered by means of transistorized inverter 11. The inverter 11 is energized by the alternator and vehicle battery system during the mobile and standby operating modes, as will appear hereinafter, and is powered by A.C. house current via rectifier 12 during the A.C. charging mode of operation. A.C. house current, to energize rectifier 12, is obtained via power cord 13. Interconnections between the electrical components of the system are made via the power distribution box 14. A variable voltage transformer 15 controls the battery charging voltage.

During the standby operating mode, the system is energized by four storage batteries 16–19, preferably located under the hood of the truck 1. When the truck's engine 23 is running, the batteries 16–19 are charged by means of a pair of alternators 21 and 22 driven by the truck's engine 23. The A.C. output from the alternators is converted to direct current (D.C.) for charging the batteries, by means of rectifier 12.

During the A.C. charging mode of operation, the truck engine 23 will be shut off and the charging current is obtained from the A.C. house current which supplies rectifier 12 in lieu of generators 21 and 22. The operation of the rectifier will be discussed more fully in connection with the description of FIGURE 5.

For convenience and brevity throughout the following description the term "module" is used to indicate either the thermoelectric element itself or the thermoelectric element together with its heat sink combined as an assembly, according to the appropriate sense.

The storage compartment 10 is formed from inner and outer shells separated by a layer of rigid foam or other insulation. One wall of compartment 10 is closed by an insulated door 4 which may be provided with either a sliding track as shown, or with hinges. The interior of compartment 10 is cooled by a plurality of thermoelectric modules, arranged in banks, and having their exposed surfaces flush with one of the compartment inner sidewalls. Each of the modules comprises a pair of extruded metal parts, between which is sandwiched a plurality of thermoelectric junctions, electrically interconnected in pairs. There are approximately 20 series-connected junctions in each module. One of the metal parts is in intimate thermal conductive relationship with the cold junction and the other part is in thermal contact with the hot junction and projects outwardly from one side of the module. This arrangement will be better understood from the description which appears hereinafter in connection with FIGURES 5 and 6. The thermoelectric elements themselves are fabricated from semiconductive materials.

Certain semiconductor materials may be utilized to achieve thermoelectric cooling by means of the Peltier effect. These materials may comprise bismuth telluride and its alloys, antimony telluride, and bismuth selenide. Relatively effective thermocouple arrays or modules of the type preferred in the construction of the present invention may be made by encasing a plurality of bismuth telluride thermocouples in an epoxy matrix. These modules permit good contact bonding since the cold junction of the modules may be directly secured to the surface to be cooled.

Each of the modules is mounted between the inner and outer shells of the storage compartment 10. The heat radiating part of the modules projects outwardly from the outer shell of the compartment into plenum 6 mounted on the exterior sidewall of the compartment 10. Blower 7 provides for the movement of air over the heat exchanger through the plenum and is exhausted from the open ends thereof.

The module bank 5 is connected to an electric circuit, which in turn is connected to a power source, either A.C. or D.C., for supplying electrical power to the modules. A protective thermostat is placed in thermal contact with one of the heat exchangers and functions in a manner to be described hereinafter.

It has been found that low-voltage D.C. motors are unsatisfactory for use in operating blowers as required in a system of the type here considered. Such D.C. motors cannot be continuously operated for long periods of time without maintenance. For this reason a brushless A.C. motor is used to drive the blower. The A.C. blower motor is powered from a transistorized inverter, which in turn obtains its power from the same low-voltage D.C. supply used to energize the thermoelectric modules.

As previously mentioned, the system has three operating modes. The first mode, referred to as the "mobile mode," exists when the truck's engine is in operation, in which case the low-voltage D.C. power is obtained by rectifying the A.C. voltage obtained from the alternators 21 and 22 driven by the engine 23. These alternators also charge storage batteries 16–19, via rectifier 12, which provide the low voltage D.C. power during the "standby mode" of operation. The third mode of operation is referred to as the "A.C. charging mode" of operation, and usually occurs at night while the truck is out of service. The A.C. charging mode of operation utilizes the 115-volt 60-cycle A.C. house current power to charge the batteries, via rectifier 12, and to operate the thermoelectric modules. In this mode of operation the A.C. line voltage is supplied to transformer 15, and may be at a higher voltage than the output of alternators 21 and 22. The rectifier 12, employed to rectify the output of the alternators 21 and 22, is also used to rectify the line voltage.

Figure 2:
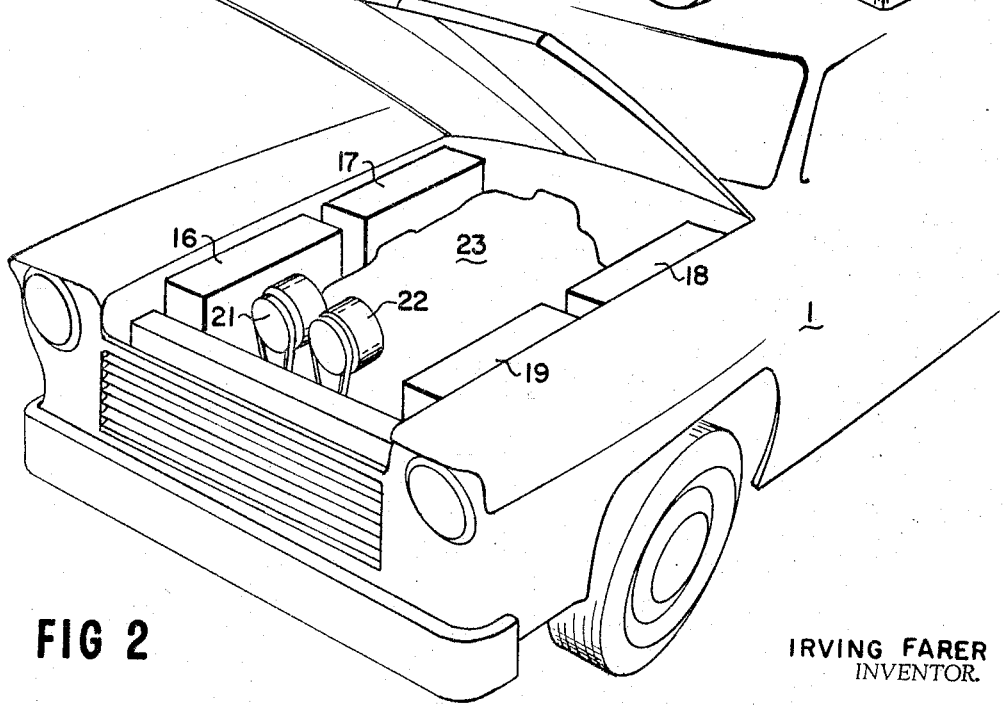
FIGURE 2 is a fragmentary perspective view illustrating the auxiliary battery and alternator installation in the truck of FIGURE 1.

There are two basic embodiments of the invention, the first of which is designed to be built into the truck body as shown in FIGURES 1 and 2. The other embodiment is an integral unit which may be prefabricated and thereafter installed, as a package, in a standard catering truck body, as shown in FIGURE 3. This latter embodiment may be divided into two subassemblies, if desired, one of which comprises the refrigerated storage compartment with the thermoelectric module and the forced air cooling system attached, and the remaining subassembly comprises the power supply system and battery pack.

The embodiment of FIGURE 3 comprises an insulated storage compartment 24 having an outer frame 25 adapted to support the apparatus within the truck body. Frame 25 comprises a plurality of legs interconnected to traverse and longitudinal rails upon which the bottom wall of the storage compartment 24 is mounted. The equipment compartment 26 extends rearwardly from the storage compartment 24. The front wall of storage compartment 24 (which is not shown in FIGURE 3) may be provided with sliding doors or other suitable means permitting access to the interior of the compartment. The equipment compartment 26 is secured to the rear wall of the storage compartment 24. Compartment 26 is enclosed on four of its six sides by screened covers which permit ambient air to freely flow therethrough. The bottom wall or floor of compartment 26 is solid and serves to support the electrical components of the system. Frame 27 extends downwardly from the floor of compartment 26 and, in addition to supporting the rear portion of the apparatus, also serves to carry auxiliary storage batteries 28 and 29, used to power the apparatus during the standby mode of operation.

The forced air cooling plenum 31 extends along the rear wall of compartment 24 and may be fabricated from sheet metal or other suitable material. The construction of plenum 31 is also shown in the cross-sectional view of FIGURE 4. Forced air from blower 32 is directed into plenum 31 and exhausts through the open ends 33 and 34 of the plenum. Blower 32 is driven by means of A.C. motor 35. The thermoelectric module bank 36, shown in FIGURE 4, is mounted in a receiving aperture 37 in the rear wall 38 of compartment 24. The radiating fins 39 of the heat sink extend into plenum 31. The walls of compartment 24 are provided with suitable insulation 41.

Motor 35 is energized by means of alternating current obtained from inverter 42. The inverter is connected to the power distribution box 43 where it is energized from the storage batteries 28 and 29, during the standby mode of operation, and from rectifier 44 during the mobile mode or A.C. charging mode of operation. Transformer 45 adjusts the charging current supplied to the batteries 28 and 29.

There is shown in FIGURES 5 and 6 details of a preferred construction of the thermoelectric element and heat sink assembly. This structure comprises a first T-shaped member 51 which for example may comprise an aluminum extrusion. In a preferred construction member 51 comprises a plate with a flat outer surface 52 approximately 4″ x 7″ in area. The opposite side of member 51 has a pedestal portion or flange 53, which for example may be approximately 1½″ high. The cold junction of the thermoelectric elements 54 are secured to the end of pedestal portion 53. A finned plate or heat radiator 55 which for example may comprise an aluminum extrusion, is secured to the hot junction of the thermoelectric elements 54. While any suitable means may be employed to secure the thermoelectric elements 54 to the first member 51 and to the heat radiator 55, a method which has been found to be satisfactory is shown in FIGURE 5 wherein the pedestal portion 53 of member 51 is provided with a counter-sunk opening 56 adapted to receive a fastening screw 57 which extends through a receiving aperture 58 thence through a receiving opening 59 in the thermoelectric element 54 and thence into a tapped hole 61 in the heat radiator 55. Three banks of elements, namely 54, 62, and 63, may be sandwiched between a single member 51 and a single heat radiator 55, as will be evident in the top view of FIGURE 6. The three banks of elements 54, 62, 63 comprising a single module are connected in series via leads 64–67 and each bank of modules is connected in parallel with the other banks of modules in the system, this arrangement being illustrated in the schematic circuit diagram of FIGURE 7.

In a typical construction the heat radiator 55 is 1½″ thick, 8″ long and 4″ high, and is provided with ten longitudinal fins, one of which is indicated at 39 in FIGURE 5. The dimensions given are merely by way of example and should not be construed in any sense as limiting.

The assembly shown in FIGURES 5 and 6, is mounted in an aperture (e.g., 37) in the wall of the storage compartment with the face 52 of member 51 being flush with the interior wall surface of the storage compartment and the back surface 69 of the heat radiator 55 being co-planar with the exterior wall surface of the storage compartment 24. The foam or other insulating material 41 located between the inner and outer walls of the storage compartment 24 is made to extend into the area 71 and 72 between member 51 and the heat radiator 55.

While the foregoing description of the invention has been described in terms of particular embodiments, it will be understood by those versed in the art that various modifications, substitutions, and omissions may be made in the construction of the invention without departing from the intended scope of the invention. For example, the number of blowers employed to force air through the cooling plenum 6 or 31 may be increased in accordance with the requirements of a particular application. Also, the cooling plenum may be modified to carry a coolant fluid other than air, as for example, a liquid coolant in which case the blower would be replaced with a liquid pump and the plenum would be in communication with a suitable heat exchanger through which the coolant liquid could be recirculated.

There is shown in FIGURE 7 a schematic circuit diagram of the electrical system which may be incorporated into either of the above described embodiments of the invention. The power supply for operating the A.C. blower motor 9 or 35 comprises a transistorized inverter. The inverter consists of a free-running multivibrator 73, a bistable multivibrator 74, an emitter follower 75, a power switching circuit 76, and an output transformer 77. The free-running multivibrator 73 comprises transistors 78 and 79 which are cross-coupled via the networks comprising resistors 81 and 82, and capacitors 83 and 84. The bases of the transistors 78 and 79 are returned to the negative power supply terminal 85 (ground) via resistors 86 and 87. The output waveform of the free-running multivibrator is shown in FIGURE 8a. This output signal is supplied to the bases of transistors 88 and 89 of the bistable multivibrator 74. Resistors 91 and 92 are the base resistors, resistors 93 and 94 are connected between corresponding ones of the collectors and the negative power supply terminal 85, and resistors 95 and 96 cross-couple the two transistors 88 and 89. Diode 97 which is connected between the common emitter connection and the positive power supply lead 98, is a silicon diode. The voltage drop across this diode 97, which is of the order of 0.5 to 0.75 volt, makes the voltage at the bases of transistors 88 and 89 more positive, by raising the emitters with respect to the positive power supply terminal 98. This will assure that transistors 88 and 89 will be cut off by the applied square wave signals to their bases. The outputs of the bistable multivibrator 74 comprise the shaped square waveform signals as shown in FIGURE 8b and are supplied via series limiting resistors 99 and 101 to the bases of emitter follower transistors 102 and 103. The outputs of the emitter followers 102 and 103 are supplied to the bases of power switching transistors 104 and 105 comprising circuit 76, via current limiting resistors 106 and 107.

Series diodes 108 and 109 are connected between the positive power supply lead 98 and the common emitters of transistors 104 and 105. The voltage drop across these diodes 108 and 109 raises the emitters with respect to the power supply reference 98 thus assuring the cutoff condition of transistors 104 and 105 in the absense of a signal applied to their bases. The use of two diodes 108 and 109 in series assures that the voltage drop thereacross will exceed that of the voltage developed across diode 97 of the multivibrator 74. The collectors of transistors 104 and 105 are connected to corresponding terminals of the primary winding of output transformer 77. The centertap 111 of the output transformer 77 is returned to the negative power supply terminal 85. The secondary winding of transformer 77 is connected directly to the A.C. blower motor 35.

The emitter follower stage 75 may be modified to include cascaded emitter followers as determined by the power requirements of the A.C. blower motor. The primary function of the emitter follower stage is to provide an impedance change between the relatively high impedance output of the bistable multivibrator 74 and the lower impedance of the power amplifier stage 75. This arrangement obviates the use of an interstage transformer.

A number of advantages are obtained by the above-described inverter circuit. Specifically, no oscillator transformer is required in the circuit which is to determine the output frequency. Also, this frequency generating portion of the circuit is isolated from the load and is therefore immune to loading effects which might otherwise adversely affect its operation. This feature also results in a more stable operation of the inverter and the avoidance of undesirable starting transients. Another advantage of the above-described arrangement is that the characteristics of the output transformer are non-critical. This is in part due to the fact that the output transformer 77 operates as a non-saturated transformer and is therefore substantially more efficient than is the saturated transformer technique employed in conventional transistorized inverters of the prior art.

During the A.C. charging mode of operation, operating power is obtained from a 115-volt A.C. house current. This house current is applied to the primary of transformer 112 via input connector 113, fuse 114 and rotary switch 115. The taps on the primary winding of transformer 112 are connected to rotary switch 115 to permit an adjustment to be made in the battery charging current, thereby compensating for variations in the house current. The center-tapped secondary winding of transformer 112 is connected to a full-wave rectifier consisting of silicon diodes 116 and 117. The negative power supply terminal 85 of the rectifier circuit is connected to the negative terminal of batteries 28 and 29. The positive terminal of the rectifier circuit is connected to the positive terminal 118 of the batteries 28 and 29 via ammeter 119. Ammeter 119 typically has a range of 0 to 20 amperes in order to provide an indication of the battery charging current.

The D.C. output voltage from batteries 28 and 29 and/or the rectifier circuit is supplied to the thermoelectric modules 121–126 via contacts 127 and 128 on relay 129. Relay 129 is under the control of ON-switch 131, OFF-switch 132 and thermostat 133. Thermostat 133 is normally closed and is physically located in thermal contact with the heat sink of one of the modules 121–126. If desired the heat sink of each module may be provided with an individual thermostat and all such thermostats would then be electrically connected in series between terminals 134 and 135.

Thermostat 133 functions to protect the equipment from overheating and turns off the D.C. power to the modules 121–126 in the event of overheating. As can be seen, the thermostat 133 is in series with the coil of relay 129. The remaining terminal of the relay coil is connected to OFF-switch 132. This switch 132 is a normally-closed pushbutton switch, the remaining terminal of which is connected to relay contact 136 and also to ON-switch 131. Relay contact 137 is connected to the remaining contact of ON-switch 131. Switch 131 is a normally-open pushbutton switch.

In order to energize the system, ON-switch 131 is momentarily closed, thus completing the circuit path from the positive terminal 118 of the batteries to the coil of relay 129 via normally closed OFF-switch 132. Inasmuch as the thermostat 133 will be in the normally-closed condition, assuming that a temperature below 130° F. exists, the remaining terminal of the relay coil will be returned to the negative (ground) terminal 85 of the batteries 28 and 29. This action will cause latching contacts 136 and 137 to close thereby maintaining the energized condition of the relay coil 129 in a self-holding circuit. The energization of relay 129 will also close contacts 127 and 128 between the positive battery terminal 118 and the positive lead to the modules 121–126. This circuit also will be completed to energize the inverter.

When the system is to be operated in the mobile mode, mode-selector switch 138 is switched from contact 139 to contact 141, thereby transferring the primary winding of transformer 112 from A.C. connector 113 to alternator 142. As will be apparent to those versed in the art, appropriate taps on transformer 112 may be provided to accommodate the output voltage of alternator 142.

When neither the A.C. house current nor the alternator 142 are supplying voltage to transformer 112, the system will obtain its operating power from batteries 28 and 29.

For convenience and simplicity, only two batteries and a single alternator are shown in FIGURE 7. However, it should be understood that additional alternators, and/or batteries may be added to extend the power capacity of the system as required. Other modifications, in addition to those specifically pointed out hereinabove will be apparent to those versed in the art upon consideration of the foregoing specification. Therefore, it is intended that the invention be limited only as indicated by the scope of the following claims.

What is claimed is:
1. A mobile thermoelectric refrigeration system comprising:
   a thermally insulated case defining a food storage compartment;
   a thermoelectric array comprising a plurality of thermoelectric modules disposed in heat exchange relationship with respect to the interior of said case to absorb heat therefrom;
   a source of direct current connected to said thermoelectric array;
   an alternating-current motor driven blower located adjacent to said thermoelectric modules whereby forced air from said blower is directed in heat exchange relationship with said modules for transferring heat away from said modules; and
   inverter means connected to said source of direct-current for supplying said blower with alternating current derived from said source.

2. A mobile thermoelectric refrigeration system as defined in claim 1 wherein said source of direct current comprises:
   rectifier means adapted to be connected to a source of alternating current to provide a low-voltage direct current output.

3. A mobile thermoelectric refrigeration system as defined in claim 1 wherein said source of direct current comprises:
   a storage battery.

4. A mobile thermoelectric refrigeration system comprising:
   a thermally insulated case defining a food storage compartment;
   a thermoelectric array comprising a plurality of thermoelectric modules disposed in heat exchange relationship with respect to the interior of said case to withdraw heat therefrom;
   rectifier means connected to said thermoelectric array for supplying low-voltage direct-current thereto;
   a storage battery connected to said rectifier means to obtain a charging current therefrom and to said array to supply direct current thereto;
   an alternating current motor-driven blower located adjacent to said thermoelectric modules whereby forced air from said blower is directed in heat exchange relationship with said modules for transferring heat away from said modules; and inverter means connected to said rectifier means and to said storage battery for supplying said blower with alternating current derived from either said rectifier means or said battery.

5. A mobile thermoelectric refrigeration system comprising:

a mobile vehicle;

a thermally insulated case defining a food storage compartment;

means supporting said compartment on said vehicle;

a plurality of thermoelectric modules disposed in heat exchange relationship with respect to the interior of said case whereby heat is withdrawn from the interior of said compartment and transferred to a location outside of said compartment;

an alternator drivingly engaged with the prime mover of said mobile vehicle for generating an alternating current;

rectifier means connected to said alternator for converting the alternating current therefrom to a low-voltage direct current;

a storage battery;

means connecting said thermoelectric modules to said storage battery and to said rectifier means, for obtaining direct current therefrom;

an alternating-current motor driven blower located adjacent to said thermoelectric modules and in heat exchange relationship therewith whereby forced air therefrom will transfer heat away from said modules;

inverter means connected to said rectifier means and to said battery for supplying said blower with alternating current derived from the direct current from said rectifier means or from said battery; and means for connecting said rectifier means to a source of alternating current located exteriorly of said vehicle.

6. A thermoelectric refrigeration system comprising:

a thermally insulated storage compartment;

a plurality of thermoelectric modules having their cold junctions located adjacent to and in thermal exchange with an interior wall of said storage compartment, and their hot junctions extending away from and spaced from said interior wall;

heat radiating fin means adjacent to and in thermal contact with said hot junctions, and extending away from said compartment;

blower means adjacent to said fin means for circulating air in heat transfer relation with said fin means;

an alternating-current electric motor for operating said blower means;

a source of alternating current connected to said motor;

rectifier means connected to said source for converting said alternating current to direct current;

means for supplying the direct current from said rectifier means to said modules;

a storage battery; and means for supplying the D.C. output from said rectifier means to said storage battery whereby said battery will be charged when said apparatus is supplied with alternating current and whereby said battery will discharge into said modules in the absence of direct current from said rectifier means.

7. A mobile thermoelectric refrigerating system comprising:

an insulated storage compartment;

support means secured to said compartment for mounting said system in a mobile vehicle;

thermoelectric means having a plurality of cold junctions in heat absorbing relationship with the interior of said compartment and a plurality of hot junctions exteriorly of said compartment;

a plurality of heat dissipating fins associated with said hot junctions for conducting heat therefrom;

a forced-air plenum into which said fins extend;

blower means for forcing a stream of cooling air through said plenum and in thermal transfer association with said fins;

an alternating-current motor drivingly coupled to said blower means;

rectifier means for providing a supply of direct current;

a storage battery adapted to be charged by said rectifier means;

a transistorized inverter having its input connected to said battery and to said rectifier means and its output connected to said motor, for converting the direct current from said battery and said rectifier to alternating current for energizing said motor; and, means for supplying direct current from said rectifier means and from said battery to said thermoelectric means.

8. A thermoelectric refrigeration system for a vehicle having a prime mover comprising:

a refrigerating chamber;

an array of thermoelectric elements having hot and cold junctions;

heat transfer means mounting said array of thermoelectric elements in a wall of said chamber so that said cold junctions are in heat exchange relationship with the interior of said chamber;

a heat dissipating element disposed in heat exchange relation with said hot junctions of said thermoelectric elements and located externally of said chamber;

alternating current motor driven blower means for dissipating heat from said heat dissipating element; and electrical generating means powered by said prime mover for supplying direct current to said array of thermoelectric elements and alternating current to said blower.

9. A mobile thermoelectric refrigeration system comprising:

a thermally insulated storage compartment;

an array of thermoelectric elements having cold junctions located adjacent to and in thermal exchange with an interior wall of said storage compartment, and hot junctions extending away from said wall;

heat exchanger means adjacent to and in thermal exchange with said hot junctions;

blower means for circulating air into heat transfer relation with said heat exchanger means;

an alternating-current electric motor for operating said blower means;

alternator means for generating an alternating current;

rectifier means connected to said alternator means for converting said alternating current to direct current;

first circuit means connecting said array of thermoelectric elements to said rectifier means;

inverter means connected to said rectifier means for converting the direct current from said rectifier means to low voltage alternating current;

second circuit means connecting said electric motor to the A.C. output of said inverter means;

a storage battery; and means connecting said storage battery to the D.C. output of said rectifier means, whereby said battery will be charged when said apparatus is supplied with alternating current from said alternator means and whereby said battery will discharge into said array of said thermoelectric elements in the absence of alternating current from said alternator means.

10. In a thermoelectric refrigeration system the combination comprising:

thermoelectric means having hot and cold sides and adapted to be energized by direct current for inducing heat flow from said cold side to said hot side;

alternating-current-motor-driven circulating means for circulating a coolant fluid in heat transfer relation to the hot side of said thermoelectric means for removing heat from said thermoelectric means;

an electrical current source connected to one of said means for energizing the latter means; and an electrical device connecting said current source and the other means for converting the current from said source to energizing current for said other means.

11. The combination according to claim 10 wherein:

said current source comprises a direct current source connected to said thermoelectric means; and said electrical device comprises an inverter connecting said direct current source and circulating means for converting the direct current from said source to alternating current for energizing said circulating means.

12. The combination according to claim 10 wherein:

said current source is a storage battery connected to said thermoelectric means; and said electrical device comprises an inverter connecting said storage battery to said circulating means for converting the direct current from said battery to alternating current for energizing said circulating means.

13. The combination according to claim 10 wherein:

said current source comprises a rectifier connected to said thermoelectric means and adapted to be energized by an alternating current source for converting alternating current from said alternating current source to direct current for energizing said thermoelectric means; and said electrical device comprises an inverter connecting the output side of said rectifier and said circulating means for converting the direct current from said rectifier to alternating current for energizing said circulating means.

14. The combination according to claim 13 including:

an alternating current generator;

means for selectively connecting said alternating current source and said generator to the input side of said rectifier;

a storage battery connected to the output side of said rectifier for receiving charging current therefrom; and means for selectively connecting said storage battery and the output side of said rectifier to said inverter.

15. In a thermoelectric refrigeration system, the combination comprising:

thermoelectric means having hot and cold sides and adapted to be energized by direct current to induce heat flow from said cold side to said hot side;

an alternating-current-motor-driven circulating means for circulating a coolant fluid in heat transfer relation to the hot side of said thermoelectric means for removing heat from said thermoelectric means;

a prime mover; and electrical generating means powered by said prime mover for supplying direct current to said thermoelectric means and alternating current to the motor of said circulating means.

16. In a refrigeration system, a thermoelectric module for installation with an opening in a wall of an insulated enclosure comprising:

a pair of thermally conductive members including spaced generally parallel plates, respectively, having outer heat transfer surfaces, and a relatively thin flange integral with one plate and extending toward the other plate in a plane generally normal to said plates in such manner as to define between said plates at opposite sides of said flange outwardly opening channel-like spaces for receiving the portions of said enclosure wall bounding opposite sides of said wall opening;

said flange and said other plate having confronting surfaces;

thermoelectric means positioned between and having hot and cold junctions disposed in heat transfer relation with said confronting surfaces, respectively, whereby the member adjacent the cold junction of said thermoelectric means comprises a heat sink and the other member comprises a heat radiator; and means joining said members and thermoelectric means into a unitary structure.

17. A thermoelectric module according to claim 16 wherein:

said flange is integral with the plate of said heat sink member.

References Cited by the Examiner

UNITED STATES PATENTS 3,138,934  6/1964  Roane _____ 62—3
3,216,216  11/1965  Rowley _____ 62—236

WILLIAM J. WYE, *Primary Examiner.*